United States Patent Office 3,403,122
Patented Sept. 24, 1968

3,403,122
EMULSION POLYMERIZATION OF WATER INSOLUBLE OMEGA - (N - PERFLUOROALKANESULFONYL) AMINOALKYL ACRYLATES OR METHACRYLATES
Patsy O. Sherman, Bloomington, and Samuel Smith, Roseville, Minn., assignors to Minnesota Mining and Manufacturing Company, St. Paul, Minn., a corporation of Delaware
No Drawing. Continuation-in-part of application Ser. No. 232,855, Oct. 24, 1962. This application Dec. 22, 1967, Ser. No. 692,680
The portion of the term of the patent subsequent to Nov. 6, 1979, has been disclaimed
10 Claims. (Cl. 260—29.6)

ABSTRACT OF THE DISCLOSURE

A process for the emulsion polymerization of relatively water-insoluble, high molecular weight monomers which are capable of undergoing free radical addition polymerization is disclosed. The process is carried out in an aqueous medium containing from about 5 percent to about 50 percent of a water-soluble organic solvent which is substantially inert with respect to reaction with the monomer and with respect to attack by free radicals present during the course of the process and which is capable of dissolving at least about one percent w./v. of the said water-insoluble monomer at 25° C.

Cross reference to related applications

This application is a continuation-in-part of U.S. application Ser. No. 232,855 filed Oct. 24, 1962, which is itself a continuation-in-part of U.S. application Ser. No. 650,294 filed Apr. 3, 1957, now U.S. Patent 3,062,765.

Detailed description

The process of emulsion-polymerization is of great industrial importance, being used in the large scale preparation of most rubbery polymers and copolymers and of some non-rubbery polymers. The latexes which are thus produced are sometimes coagulated to recover the solid polymers, but they can be and are often used directly, such as for example in latex paints, adhesives, coatings for textiles and paper, etc.

Heretofore it has been the general practice to carry out polymerization in water-oil types of emulsion with the aid of emulsifying agents and in the presence of free radical initiators. Although some monomers emulsion-polymerize easily, others especially those of high molecular weights and consequent low water solubility, can be polymerized by this method only with difficulty and in poor yield. Thus, specialized processes have been resorted to for the group of substantially water-insoluble monomers, e.g. the use of special emulsifiers, the maintenance of a high concentration of emulsifier to maintain latex stability and pre-emulsification of the monomer in the water with high-speed agitation, followed by slow and carefully regulated agitation during polymerization to avoid monomer droplet growth. In another process for the preparation of aqueous dispersions of polymers, bulk, solution or suspension polymerized materials are dissolved in a large quantity of solvent, the solution is dispersed in water containing a relatively large quantity of emulsifier with high speed agitation and the solvent is removed.

A number of difficulties attend these specialized processes and tend to reduce their utility. They are difficult and expensive processes to carry out. Their products often contain sufficient emulsifier to render films coated from them water sensitive. The latexes thus prepared invariably have large particle sizes; and this either renders them unstable on storage for even short periods, particularly with dilution, changes of temperature, changes of pH, etc. (i.e. with particles of 5,000 A. diameter or larger), or renders them undesirable for coatings because of graininess, lack of luster, or microscopic pinholes present in films formed by drying such latexes. In spite of such difficulties, these specialized processes have been fairly successful with a number of monomers of low water-solubility. With similar monomers which are substantially water-insoluble, however, they have been generally unsuccessful and such monomers have heretofore had to be polymerized by bulk and solution techniques.

It is an object of this invention to provide an efficient and practical process for the emulsion-polymerization of certain relatively water-insoluble, ethylenically unsaturated monomers. It is another object of the invention to provide a process for emulsion-polymerizing certain ethylenically unsaturated monomers having high molecular weight, which are capable of undergoing free radical addition polymerization, to produce latexes which are comparable to normal latexes of monomers of relatively low-molecular weight instability, particle size, freedom from excess emulsifier, and the like. Other objects of the invention will be apparent from the following disclosure.

In accordance with the above and other objects of the present invention it has been found that the emulsion-polymerization of ethylenically unsaturated monomers capable of undergoing free radical addition polymerization which, because of their high molecular weight and water-insolubility are difficult or impossible to emulsion-polymerize by conventional methods, can readily be accomplished by carrying out the polymerization in an aqueous medium containing about 5% to about 50% of an inert water-soluble organic solvent in which the monomer is at least slightly soluble.

The process of the invention using a water-organic solvent emulsion medium is employed with monomer systems capable of undergoing free radical addition polymerization, of which at least one monomer is soluble in an amount less than one part by weight in a mixture of 80 parts by weight of methanol and 25 parts by weight of water at 25° C. By the use of the process, monomers which cannot be successfully emulsion-polymerized using the processes heretofore known to the art can be emulsion-polymerized in good yield to produce stable, useful latexes. Thus, the process of the invention produces unexpectedly useful results within the area of its operation. These results are especially unpredictable in the case of the fluorocarbon-containing monomers, which could not be expected to act in any way comparable to the corresponding hydrocarbon analogues thereof.

A convenient method of determining whether a particular monomer is sufficiently water-insoluble so that the emulsion-polymerization process of the invention using a water:organic medium is advantageously applied thereto is the following: (1) a solution of one gram of the monomer in 80 grams of absolute methanol is prepared, and (2) a measured amount of water is cautiously added to this solution until an endpoint is indicated by the appearance of turbidity or phase separation. If the monomer cannot be completely dissolved in the methanol, or if turbidity or phase separation appear before 25 milliliters of water have been added, the present process can be advantageously employed for polymerization. Typical examples of such monomers are: lauryl, tridecyl, tetradecyl, hexadecyl and octadecyl acrylates, methacrylates and vinyl ethers; higher vinyl esters such as vinyl laurate, vinyl myristate, vinyl palmitate and vinyl stearate; higher 1,1-dihydroperfluoroalkyl acrylates and methacrylates such as 1,1-dihydroperfluorooctyl methacrylate and 1,1-dihydroperfluorodecyl acrylate; ω-(N-alkyl, N-perfluoroalkane) aminoalkyl acrylates and methacrylates; higher fluorinated vinyl esters such as vinyl, N-ethyl, N-perfluorooctane sulfonyl glycinate; perfluoroalkanesulfonamidoalkyl acrylates such as β-(N-ethyl, N-perfluorohexanesulfonyl) aminoethyl acrylate, β-(N-ethyl, N-perfluorooctanesulfonyl) aminoethyl acrylate, β-(N-propyl, N-perfluorooctanesulfonyl) aminoethyl acrylate, β-(N-ethyl, N-perfluorooctanesulfonyl) aminoethyl methacrylate, ω-(N-ethyl, N-perfluorooctanesulfonyl) aminodecyl acrylate, β-(N-perfluorododecanesulfonyl) aminoethyl acrylate, and β-(N-butyl, N-perfluorooctanesulfonyl) aminoethyl methacrylate, and the like.

The preferred perfluoroalkanesulfonamidoalkyl acrylate monomers which are suitable for use in the process of the invention conform to the formula:

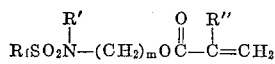

wherein $R_f$ is a perfluoroalkyl group containing from 6 to 12 carbon atoms, R' is hydrogen or an alkyl group containing from one to four carbon atoms, m is from 2 to 10 and R" is hydrogen or methyl. The stable latexes of the present invention prepared using these fluorocarbon monomers (which can be referred to as ω-(N-perfluoroalkanesulfonyl) aminoalkyl acrylates and methacrylates) can be used to size textile fabrics. The resulting coated fabrics have useful oil- and water-repellent properties.

The inert solvent which is used in the process is a water-soluble organic solvent which will not react with the monomer. Examples of solvents which are suitable for the practice of the invention are lower alkanols, such as methanol, and ethanol; water-soluble glycols, such as ethylene glycol, propylene glycol; water-soluble ketones such as acetone and methyl ethyl ketone; cyclic ethers, such as dioxane; cyclic amines such as pyridine; and the like. While it is necessary to determine empirically which specific solvent will produce optimum results with any particular monomer system, any solvent of the type described will produce useful results in the process of the invention.

A further distinguishing characteristic of the relatively high molecular weight monomers which are useful in the process of the invention, as well as the organic solvents useful therein, is that the monomer must be soluble to the extent of at least about one gram of monomer in 100 ml. of the particular solvent which is to be added to its emulsion medium. This requirement may also be expressed as requiring the monomer to be soluble to the extent of at least about 1% w./v. in the organic solvent.

In the process of the invention, the selected inert, water-soluble organic solvent is added to the aqueous medium in amount of about 5 to about 50% by weight of that of the water present. Below about 5% concentrations of the solvent, its effects are very slight, while at concentrations over about 50% the formation of precoagulum (an undesirable precipitate of polymer) tends to become excessive, thereby reducing the overall conversion of monomer to latex. The maximum benefits of the process are invariably realized when the solvent employed is present in concentration ranging from 10% to 40% of the amount of water, and this range is therefore preferred.

In carrying out the process, once the latex has been formed it is, of course, independent of the organic solvent, which can be removed by steam or vacuum distillation or other comparable techniques, and can be replaced by water without adversely affecting the properties of the emulsion. This may be done if the odor or the flammability of the solvent is undesirable in the particular application to which the latex is put.

Having thus broadly described the process of the invention, there are appended several specific examples of its operation. These examples are to be understood as illustrative only and should not be construed as being limiting in any sense. Thus, for example, any other conventional water-soluble free radical initiator may be used in place of the potassium persulfate used in the examples (e.g. ammonium persulfate, hydrogen peroxide, sodium perbenzoate, etc.) as well as ultraviolet light or ionizing radiation. Furthermore, promoters can be used if desired, such as sodium bisulfite, ferrocyanide salts, ferrous salts and amines, and the like. Other variations known in the art can be used in conjunction with the process of this invention since the advantageous presence of the specific solvents which are employed does not interfere with the operation of the conventional means known to the art to be useful in processes involving emulsion-polymerization, and the use of such variation is contemplated to be within the scope of the invention.

The procedure used in each of the examples, and the amounts of the ingredients employed, is as follows, except as otherwise specified: A suitable vessel is charged, frozen in liquid air, evacuated to a pressure of less than 0.01 mm. of mercury, thawed and refrozen, re-evacuated and finally sealed. The vessel is then agitated in a 50° C. water bath for 16 hours. The charge, except where otherwise specified, is 100 parts by weight of monomer, 5 parts of emulsifier, ½ part potassium persulfate, and 180 parts of medium.

Example 1

The emulsion polymerization of vinyl stearate, a typical long chain hydrocarbon monomer suitable for use in the process of the invention.

To determine suitability of vinyl stearate for advantageous use in the process, water was titrated at room temperature into a solution of one gram of vinyl stearate in eighty grams of absolute methanol until the appearance of turbidity which remained after thoroughly mixing the solution. It was found that eight milliliters of water were required. From this it is seen that the emulsion polymerization of vinyl stearate will be improved by the addition of a suitable organic solvent to the emulsion medium.

The procedure set forth above was used for polymerizing each batch containing the ingredients and amounts thereof specified. Both anionic and cationic emulsifiers were used. In this connection, anionic (e.g. sodium stearate, potassium oleate, sodium lauryl sulfate, etc.), cationic (e.g. dodecylamine hydrochloride, cetyl trimethyl ammonium bromide, etc.) and nonionic (e.g. alkyl aryl polyether alcohols) emulsifiers can all be used in the practice of our invention in the same manner as they are when a conventional aqueous medium is used.

The following table shows the results obtained when vinyl stearate was subjected to emulsion polymerization under varying conditions, in media containing various amounts of organic solvents coming within the scope of the invention. An attempt to produce a latex in a medium containing water only is included for purposes of comparison.

TABLE I

| Emulsifier | Medium Amt. | Conversion to Latex, Percent | Average Latex particle Size, A. | Remarks |
|---|---|---|---|---|
| Sodium stearate | Water, 180 | 47 | 30,000 | Coagulated substantially immediately on standing. |
| Do | Water, 135; Methanol, 45 | 77 | 900 | Stable, fluid latex. |
| Do | Water, 126; Acetone, 54 | 96 | 600 | Viscous, stable latex. |
| Sodium stearate (3 parts) | Water, 126; Acetone, 54 | 82 | 1,000 | Stable, fluid latex. |
| Dodecylamine HCl | Water, 144; Acetone, 36 | 80 | 1,000 | do. |

Example 2

Twenty milliliters of water were tolerated by a solution of one gram of lauryl methacrylate in eighty grams of methanol at room temperature before turbidity was observed thus indicating the suitability of this monomer for conversion to a latex in a medium containing an organic solvent according to the process of the invention. Significant and unexpected improvements in both conversion and quality are shown in the emulsion polymerization of lauryl methacrylate when an organic solvent is added to the aqueous emulsion medium.

Likewise, seven milliliters of water were tolerated at room temperature by octadecyl methacrylate in the titration test. The successful emulsion-polymerization of octadecyl methacrylate (which will not readily emulsion-polymerize by conventional methods) is shown with four different emulsifiers using water:acetone media.

Table II shows the results obtained:

to the higher members of series of monomers, as compared with the results using the lower members of the series.

The average particle size in each of the latexes produced was less than 900 A.

Solutions of one gram of 1,1-dihydroperfluorohexyl-methacrylate and 1,1-dihydroperfluorooctylmethacrylate in eighty grams of absolute methanol tolerated the addition of 40 and 20 milliliters of water respectively at room temperature before turbidity or phase separation. It was thus shown that there would be no improvement of quality or percent conversion in the emulsion polymerization of the former with the addition of an appropriate organic solvent to the emulsion medium of the former, but that such improvements could be expected with the latter. These indications are borne out by the data set forth in Table III.

TABLE III

| Monomer | Emulsifier | Medium Amt. | Conversion to Latex, percent | Extent of Precoagulation, percent | $(\eta)$[1] of Emulsified Polymer | $(\eta)$[1] of Precoagulation | Appearance of Latex |
|---|---|---|---|---|---|---|---|
| 1,1-dihydroperfluorohexyl methacrylate[2] | Dodecylamine hydrochloride | Water, 180 | 99 | 0 | 1.10 | | Clear fluid latex. |
| Do.[2] | do | Water, 135; Methanol, 45 | 100 | 0 | 0.92 | | Do. |
| 1,1-dihydroperfluorooctyl methacrylate[2] | Dodecylamine hydrochloride | Water, 180 | 40 | 30 | 0.21 | 0.77 | Fluid latex clear. |
| Do.[2] | do | Water, 135; Methanol, 45 | 100 | 0 | 0.70 | | Do. |
| Do.[2] | Potassium salt of a highly fluorinated carboxylic acid. | Water, 180 | 18 | 80 | 0.49 | 0.96 | Do. |
| Do.[2] | do | Water, 126; Acetone, 54 | 100 | 0 | 1.24 | | Do. |

[1] Inherent viscosity. [2] Both of these monomers are over 1% soluble in methanol and infinitely miscible with acetone at room temperature.

Example 4

The data set forth in Table IV show the effects of increasing (up to an optimum value) the percentage of

TABLE II

| Monomer | Emulsifier | Medium Amt. | Conversion to Latex, percent | Average Latex Particle Size, A. | Appearance of Latex | $(\eta)$[1] |
|---|---|---|---|---|---|---|
| Lauryl methacrylate[2] | Duponol ME[3] | Water, 180 | 52 | 1,730 | Large amount of precoagulation. | 0.93 |
| | do[3] | Water, 144; Acetone, 36 | 92 | 1,110 | Very small amount of precoagulation. | 1.31 |
| Octadecyl methacrylate[2] | Duponol ME | Water, 144; Acetone, 36 | 87 | 800 | Somewhat viscous latex. | 0.48 |
| | Dodecylamine hydrochloride | Water, 144; Acetone, 36 | 95 | 1,000 | Stable, fluid latex | 0.61 |
| | Sodium stearate | Water, 108; Acetone, 72 | 59 | | Some precoagulation | 0.39 |
| | do | Water, 90; Acetone, 90 | 60 | | do | 0.25 |
| | Potassium salt of N-ethyl, M-perfluoro-octane sulfonyl glycine. | Water, 108; Acetone, 72 | 78 | | Small amount of precoagulation. | 0.36 |
| | do | Water, 90; Acetone, 90 | 0 | | Total precoagulation | |

[1] Inherent viscosity. [2] Lauryl methacrylate and octadecyl methacrylate are both more than 10% soluble in acetone at room temperature. [3] Four parts of emulsifier were used. ---- Not determined.

Example 3

In this example are illustrated the higher molecular weights which can be obtained by using the present process as shown by the increased inherent viscosity of the products, and also the sharp line of demarcation which distinguishes the scope of operation of the process as applied organic solvent in the medium in the process of emulsion-polymerization of octadecyl acrylate with a hydrocarbon emulsifier and with a fluorocarbon emulsifier. Improvements in the percentage conversion of monomer to latex, molecular weight of latex (as shown by the inherent viscosity), latex particle size and latex stability are shown to be brought about by the addition of the solvent.

TABLE IV

| Monomer | Emulsifier | Medium Amt. | Conversion to Latex, Percent | $(\eta)$ [1] of Emulsified Polymer | Average Latex Particle Size, A. | Appearance of Latex |
|---|---|---|---|---|---|---|
| Octadecyl acrylate [2] | Sodium stearate | Water, 180 | 49 | 0.32 | 10,000 | Unstable, coagulated almost immediately. |
| Do.[2] | do | Water, 171; Acetone, 9 | 54 | 0.29 | 10,000 | Do. |
| Do.[2] | do | Water, 162; Acetone, 18 | 65 | 0.28 | 800 | Viscous, stable. |
| Do.[2] | do | Water, 153; Acetone, 27 | 89 | 0.34 | 600 | Viscous, stable latex. |
| Do.[2] | do | Water, 135; Acetone, 45 | 96 | 0.61 | 600 | Do. |
| Do.[2] | do | Water, 126; Acetone, 54 | 100 | 0.62 | 600 | Do. |
| Do.[2] | Potassium salt of N-ethyl, N-perfluorooctane sulfonyl glycine. | Water, 180 | 0 | | | Complete precoagulation. |
| Do.[2] | do | Water, 153; Acetone, 27 | 62 | 0.32 | 1,000 | Stable, fluid latex. |
| Do.[2] | do | Water, 126; Acetone, 54 | 97 | 0.48 | 1,000 | Do. |

[1] Inherent viscosity.   [2] Octadecyl acrylate is about 1% soluble in methanol and more than 10% soluble in acetone at room temperature.

Example 5

The results (both in quality and in percent conversion of monomer to latex polymer) of carrying out the emulsion-polymerization of several fluorocarbon monomers in aqueous solutions of organic solvents are illustrated in the following table. In some cases control lots (in which the polymerizations are carried out in water) are included for comparison.

TABLE V

| Monomer | Emulsifier | Medium Amt. | Conversion to Latex, Percent | Average Latex Particle Size, A. | Appearance of Latex |
|---|---|---|---|---|---|
| 1,1-dihydroperfluoro-hexylacrylate | Dodecylamine hydrochloride. | Water, 180 | 97 | 900 | Clear stable. |
| Do | do | Water, 144; Acetone, 36 | 100 | 900 | Do. |
| 1,1,-dihydro perfluoro-decylacrylate | Potassium salt of a highly fluorinated carboxylic acid. | Water, 180 | 0 | | Total, precoagulation. |
| Do | do | Water, 135; Methanol, 45 | 88 | 900 | Clear stable. |
| β-(N-ethyl, N-perfluorohexane sulfonyl)-aminoethyl acrylate. | Potassium salt of N-ethyl, N-perfluoro-octane sulfonyl glycine. | Water, 180 | 27 | | Couldy, unstable, large amount of precoagulation. |
| Do | do | Water, 126; Acetone, 54 | 99 | | Clear, stable. |
| β-(N-ethyl, N-perfluoro-octane sulfonyl)-aminoethyl acrylate. | do | Water, 180 | 0 | | Total precoagulation. |
| Do | do | Water, 126; Acetone, 54 | 100 | 900 | Cloudy, stable. |
| Do | Potassium salt of a highly fluorinated carboxylic acid. | Water, 180 | 24 | 5,000 | Cloudy, almost total precoagulation. |
| Do | Same (10 parts) | do | 100 | 200,000 | Cloudy, viscous, unstable, coagulated substantially immediately. |
| Do | do | Water, 108; Methanol, 72 | 94 | | Slightly cloudy, stable. |
| Do | do | Water, 126; Acetone, 54 | 93 | 900 | Cloudy, stable. |
| β-(N-propyl, N-perfluoro-octane sulfonyl)-aminoethyl acrylate. | Potassium salt of N-perfluoro-octane sulfonyl glycine. | Water, 108; Acetone, 72 | 95 | | Do. |
| β-(N-ethyl, N-perfluoro-octane sulfonyl)-aminoethyl methacrylate. | Potassium salt of N-ethyl, N-perfluoro-octane sulfonyl glycine. | Water, 180 | 0 | | Total precoagulation. |
| Do | do | Water, 126; Acetone, 54 | 96 | About 1,000 | Clear stable latex. |
| Do | N,N-dimethyl-(γ-perfluoro-octane sulfonyl-amido)-propyl amine hydrochloride. | Water, 126; Acetic acid, 54 | 93 | do | Do. |
| ω-(N-ethyl, N-perfluoro-octane sulfonyl)-aminodecyl acrylate. | Potassium salt of N-ethyl, N-perfluoro-octane sulfonyl glycine. | Water, 126; Acetone, 54 | 89 | do | Do. |
| 50 octadecyl acrylate: 50 β-(N-propyl, N-perfluoro-octane sulfonyl)-aminoethyl acrylate. | N,N-dimethyl-(γ-perfluoro-octane sulfonyl-amido)-propyl amine hydrochloride. | do | 82 | do | Do. |

Example 6

β-(N-propyl, N-perfluorooctanesulfonyl)-aminoethyl acrylate, of the formula:

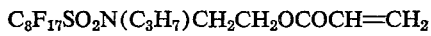

$$C_8F_{17}SO_2N(C_3H_7)CH_2CH_2OCOCH=CH_2$$

was emulsion homopolymerized as follows:
About 12.6 grams of water, 0.5 gram of

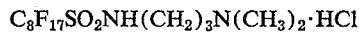

$$C_8F_{17}SO_2NH(CH_2)_3N(CH_3)_2 \cdot HCl$$

emulsifier, 10 grams of monomer, 5.4 grams of acetone and 0.02 gram of potassium persulfate were charged to a heavy-walled Pyrex glass ampoule. The polymerization procedure was that described just prior to Example 1. The resulting latex represented 90% conversion to stably emulsified product. It was coagulated to form a soft, flexible plastic.

Example 7

Emulsion-copolymerization of chloroprene and β-(N-propyl, N-perfluorooctanesulfonyl)-aminoethyl acrylate. Chloroprene (5 grams) and β-(N-propyl, N-perfluoro-octanesulfonyl)-aminoethyl acrylate (5 grams) were polymerized in a heavy-walled Pyrex glass ampoule in the presence of 12.6 grams of water, 0.5 gram of

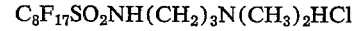

$$C_8F_{17}SO_2NH(CH_2)_3N(CH_3)_2HCl$$

emulsifier, 5.4 grams of acetone, 0.02 gram of potassium persulfate and 0.02 gram of tertiary dodecyl mercaptan using the procedure described just prior to Example 1. The resulting latex, which represented an 83% conversion of the monomers to a stable copolymer emulsion, was subsequently coagulated to form an opaque tack-free rubber.

Example 8

Emulsion-copolymerization of chloroprene and β-(N-ethyl, N-perfluorooctanesulfonyl) aminoethyl methacrylate.

A 250 milliliter 3-neck flask fitted with a stirrer and equipment for purging with oxygen-free nitrogen was charged as follows:

| | Grams |
|---|---|
| Chloroprene | 25 |
| Distilled water | 63 |
| Acetone | 27 |
| $C_8F_{17}SO_2NH(CH_2)_3N^+(CH_3)_3Cl^-$ (emulsifier) | 2.5 |
| $K_2S_2O_8$ | 0.1 |

After 2 hours reaction at 50° C. under an atmosphere of nitrogen 86% of the chloroprene was converted to stably emulsified polymer. 25 grams of β-(N-ethyl, N-perfluorooctanesulfonyl) aminoethyl methacrylate were then added to the flask and the reaction continued for 4.5 hours at which time 83% of the total monomer was converted to stable copolymer latex.

Example 9

Emulsion-copolymerization of vinyl chloride and vinyl stearate.

Vinyl chloride is sufficiently water-soluble to emulsion-homopolymerize easily in water alone as a medium, whilst vinyl stearate is sufficiently water-insoluble so that its emulsion-homopolymerization is extremely difficult by heretofore known methods.

The following were charged to each of two crown cap pressure bottles:

| | Pts. |
|---|---|
| Vinyl chloride | 50 |
| Vinyl stearate | 50 |
| Sodium stearate | 4 |
| Potassium persulfate | 0.5 |

Water and acetone as shown in the table set forth below.

Excess vinyl chloride was added as the last ingredient and the excess was permitted to volatize, thus purging the bottles of air prior to sealing. The bottles were tumbled end-over-end in a 50° C. bath until about 30% conversion to polymer was obtained. The polymer was then separated, washed with water and finally extracted with boiling methanol in a soxhlet apparatus to remove all unreacted vinyl stearate. Chlorine contents were then determined on the dry polymer. The results are shown below.

| Run No. | Emulsion Medium | Appearance of Latex | Percent Cl in Polymer | Polymer Composition |
|---|---|---|---|---|
| 1 | Water, 180 | Completely precoagulated | 49.0 | 86:14 ViCl:ViSt (by wt.). |
| 2 | Water, 126; Acetone, 54 | Stable, fluid latex | 36.5 | 64:36 ViCl:ViSt (by wt.). |

The last three examples demonstrate the important results obtained with the process of the invention in copolymerization reactions involving at least one long chain, highly water insoluble monomer, in producing superior latexes and increasing the rate of combination of the long chain monomer with smaller, more water-soluble comonomers.

These and similar emulsion copolymers of (1) ethylenically unsaturated monomers which normally undergo free radical addition polymerization with ease (i.e. which are soluble in an amount greater than about one part by weight in a mixture of 80 parts by weight of methanol and 25 parts by weight of water at 25° C.) and (2) the normally difficultly emulsion polymerizable monomers as described herein have interesting and unusual utility as do copolymers according to the invention in which both comonomers are normally difficultly emulsion polymerizable. Permanent internal plasticization can be achieved in such polymers, the relatively water-insoluble long-chain monomer acting as the plasticizer. This plasticizer system has the advantages over regular plasticizer systems of not migrating and of not being difficult to mix homogeneously with the polymer as are regular plasticizers used in latex formulations. As in other plasticizers the long-chain comonomer often makes it possible to form films at room temperature from the emulsion state. Unplasticized polyvinyl acetate, for example, applied to a surface from an emulsion and dried at room temperature does not form a continuous film. In order to form a continuous film, it must be heated to at least 35° C. and this makes it impractical for some applications (e.g., latex paints). An emulsion of an 85%:15% copolymer by weight of vinyl acetate and vinyl stearate, however, does form a continuous film at room temperature upon drying.

Emulsion copolymers of one normally-difficult-to-emulsion-polymerize fluorocarbon monomer and a hydrocarbon monomer are highly useful as cloth treatments to impart oleophobic and hydrophobic properties to the treated cloth. A preferred class of copolymers of this type are copolymers of the perfluoroalkanesulfonamidoalkyl acrylates, with normally easily emulsion polymerizable monomers such as ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, sulfonated styrenes, halogenated styrenes, acrylic acid and alkyl esters thereof, methacrylic acid and alkyl esters thereof, methacrylonitrile, acrylamide, methacrylamide, vinyl carbazole, vinyl pyrrolidone, vinyl pyridine, vinyl alkyl ethers, vinyl alkyl ketones, butadiene, chloroprene, fluoroprene and isoprene.

It will thus be seen that the process of the invention produces highly advantageous and desirable results.

A useful procedure utilizing the novel features of the invention and suitable for production of large amounts of useful latexes is illustrated by the following example.

Example 10

A 75 gallon glass-lined kettle equipped with a paddle stirrer and means for heating was charged with the following ingredients:

| | Lb. |
|---|---|
| Deionized water | 126 |
| Potassium salt of N-ethyl, N-perfluorooctanesulfonyl glycine | 5 |
| β-(N-propyl, N-perfluorooctanesulfonyl) aminoethyl acrylate | 100 |
| Acetone | 54 |
| Potassium persulfate | 0.5 |

The water was placed in the kettle first and was boiled to expel dissolved air. The emulsifier was then dissolved in the hot water while stirring under a blanket of nitrogen. The acetone and the monomer were separately mixed and the mixture was added. The temperature was then adjusted to 50° C. and the potassium persulfate was added. The contents of the kettle were then stirred. Nitrogen pressure of 18 p.s.i. was maintained in the kettle throughout the period of reaction. After about two hours at 50° C., polymerization was essentially complete, but stirring at this temperature was continued for an additional two hour period. A complete conversion to polymer was obtained, of which 90% was present in stable latex form. The average latex particle diameter, measured by light scattering techniques, was of the order of 1000 A. The polymer had inherent viscosity=0.41.

As used herein, the term "inherent viscosity" signifies the number obtained by dividing the natural logarithm of the relative viscosity by the concentration of the polymer in grams per 100 ml. of the solvent in which viscosity is determined. The relative viscosity is the ratio of solution viscosity to solvent viscosity. In the case of hydrocarbon polymers, inherent viscosity was determined using 0.15% solution in 4:1 benzene:isopropanol mixtures; in the case of fluorocarbon polymers, inherent viscosity was determined using 0.15% solutions in 2:1 methyl perfluorobutyrate:acetone mixtures. All determinations were made at 25° C.

The useful latexes of the present invention as hereinabove described are further characterized by the fact that they are stable latexes having particle sizes of the order of 1000 A. (i.e., in the range of about 700 to about 1500 A.), comprised of polymers made from significant amounts of monomers of relatively high molecular weight.

What is claimed is:

1. The process for emulsion polymerization which comprises charging to a suitable reaction vessel a monomer charge which includes a water-insoluble, high-molecular weight ω-(N-perfluoroalkanesulfonyl) aminoalkyl ester monomer selected from the class consisting of acrylates and methacrylates wherein the nitrogen atom is substituted by a member of the class consisting of hydrogen and alkyl groups containing from one to four carbon atoms, said monomer being soluble in an amount less than about one part by weight in a mixture of 80 parts by weight of methanol and 25 parts by weight of water at 25° C., an aqueous medium containing from about 5 percent to about 50 percent of a water-soluble organic solvent which is substantially inert with respect to reaction with the monomer and with respect to attack by free radicals present during the course of the process and which is capable of dissolving at least about one percent w./v. of the said water-insoluble monomer at 25° C., and an emulsifier, and agitating the resulting charge under free radical conditions until appreciable polymerization has occurred.

2. The process of claim 1 wherein the monomer charge includes β-(N-ethyl, N-perfluorooctanesulfonyl) aminoethyl methacrylate.

3. The process of claim 1 wherein the monomer charge includes ω-(N-ethyl, N-perfluorooctanesulfonyl) aminodecyl acrylate.

4. The process of claim 1 wherein the monomer charge includes an ethylenically unsaturated free radical addition polymerizable monomer which is soluble in an amount greater than about one part by weight in a mixture of 80 parts by weight of methanol and 25 parts by weight of water at 25° C.

5. The process of claim 4 wherein the monomer charge consists of chloroprene and β-(N-ethyl, N-perfluorooctanesulfonyl) aminoethyl methacrylate.

6. A stable latex of particle size of the order of about 1000 A. produced by charging to a suitable reaction vessel a monomer charge which includes a water-insoluble, high-molecular weight ω-(N-perfluoroalkanesulfonyl) aminoalkyl ester monomer selected from the class consisting of acrylates and methacrylates wherein the nitrogen atom is substituted by a member of the class consisting of hydrogen and alkyl groups containing from one to four carbon atoms, said monomer being soluble in an amount less than about one part by weight in a mixture of 80 parts by weight of methanol and 25 parts by weight of water at 25° C., an aqueous medium containing from about 5 percent to about 50 percent of a water-soluble organic solvent which is substantially inert with respect to reaction with the monomer and with respect to attack by free radicals present during the course of the process and which is capable of dissolving at least about one percent w./v. of the said water-insoluble monomer at 25° C., and an emulsifier, and agitating the resulting charge under the free radical conditions until the latex has formed.

7. A latex according to claim 6 wherein the monomer charge includes β-(N-ethyl, N-perfluorooctanesulfonyl) aminoethyl methacrylate.

8. A latex according to claim 6 wherein the monomer charge includes ω-(N-ethyl, N-perfluorooctanesulfonyl) aminodecyl acrylate.

9. A latex according to claim 6 wherein the monomer charge includes an ethylenically unsaturated free radical addition polymerizable monomer which is soluble in an amount greater than about one part by weight in a mixture of 80 parts by weight of methanol and 25 parts by weight of water at 25° C.

10. A latex according to claim 9 wherein the monomer charge consists of chloroprene and β-(N-ethyl, N-perfluorooctanesulfonyl) aminoethyl methacrylate.

References Cited

UNITED STATES PATENTS 3,062,765  11/1962  Sherman et al. _____ 260—29.6

MURRAY TILLMAN, *Primary Examiner.*

W. J. BRIGGS, SR., *Assistant Examiner.*